(12) United States Patent
Jiang et al.

(10) Patent No.: US 7,861,249 B2
(45) Date of Patent: *Dec. 28, 2010

(54) THREAD TO THREAD COMMUNICATION

(75) Inventors: Hong Jiang, San Jose, CA (US);
Michael K. Dwyer, El Dorado Hills, CA (US)

(73) Assignee: Intel Corporation, Santa Clara, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 12/539,727

(22) Filed: Aug. 12, 2009

(65) Prior Publication Data

US 2009/0300651 A1    Dec. 3, 2009

Related U.S. Application Data

(63) Continuation of application No. 10/880,155, filed on Jun. 28, 2004, now Pat. No. 7,594,236.

(51) Int. Cl.
*G06F 9/44* (2006.01)
*G06F 9/46* (2006.01)
*G06F 13/00* (2006.01)

(52) U.S. Cl. ...................................... 719/313; 719/318

(58) Field of Classification Search ................. 719/310, 719/313, 318; 709/201, 238, 245; 726/2, 726/4–5; 713/182, 189

See application file for complete search history.

*Primary Examiner*—Qing Wu
(74) *Attorney, Agent, or Firm*—Trop, Pruner & Hu, P.C.

(57) ABSTRACT

Thread to thread communication is provided. A first thread registers with a gateway for receiving communication. Registration includes identifying a location for receiving messages. The gateway maps message payloads received from second threads to the location of the first thread. The first thread detects a payload in the location and consumes it for processing.

13 Claims, 5 Drawing Sheets

THREAD TO THREAD COMMUNICATION

CROSS-REFERENCE TO RELATED APPLICATIONS

This application is a continuation of U.S. patent application Ser. No. 10/880,155, filed on Jun. 28, 2004, which issued as U.S. Pat. No. 7,594,236.

TECHNICAL FIELD

Embodiments of the present invention relate generally to parallel processing, and more particularly to techniques for thread to thread communication.

BACKGROUND INFORMATION

A thread is an independent block of executable instructions that is capable of being processed in duplicate and in parallel. Software may be developed such that it is threaded, meaning that it may be processed in duplicate and in parallel. Parallel processing is particularly useful when there is a large amount of independent processing occurring within a threaded application or when there is a large amount of data that a threaded application processes. Parallel processing techniques permit more efficient use of processors and memory and provide improved processing throughput in multi-processor architectures.

Some example areas where parallel processing has been particularly beneficial and deployed within the industry include graphics and multimedia processing. These areas generally consume voluminous amounts of data and much of that data can be independently processed or independently rendered to generate the desired output.

Typically, threaded applications use a module which controls the processing flow of multiple threaded applications, which may be simultaneously processing. That is, a module determines when some threads have finished their processing and when certain other threads should be initiated for processing. The module is tightly coupled to the threaded applications which it manages. This means that the module retains processing logic in order to identify and communicate with the threads that it is managing. Thus, if other circumstances within a multi-processor environment alter a processing location for a particular thread, the module will have processing logic to be notified of this changed location. As a result, the module may become unruly and may need regular adjustments and maintenance in order to efficiently manage its threaded applications within a multi-processor environment.

Additionally, in many applications (e.g., graphics, multimedia, digital signal processing, numerical computations, physical modeling, artificial intelligence, etc.) there may be inherent data dependencies which may limit the amount of achievable thread parallelism. This is particularly a problem for some multi-media applications, where data units may be large, and only a small finite number of independent threads may be found because of the volume of identified data dependencies. These data unit dependencies may also be multi-dimensional and complex, such that conventional parallel processing techniques offer little processing throughput improvement even when parallel processing is used because only a few independent threads are identifiable and processed in parallel. In fact, high the overhead and cost associated with thread communication are common problems in present parallel architectures and approaches.

Therefore, there is a need for improved thread to thread communication for parallel processing techniques.

DESCRIPTION OF THE EMBODIMENTS

Figure 1:
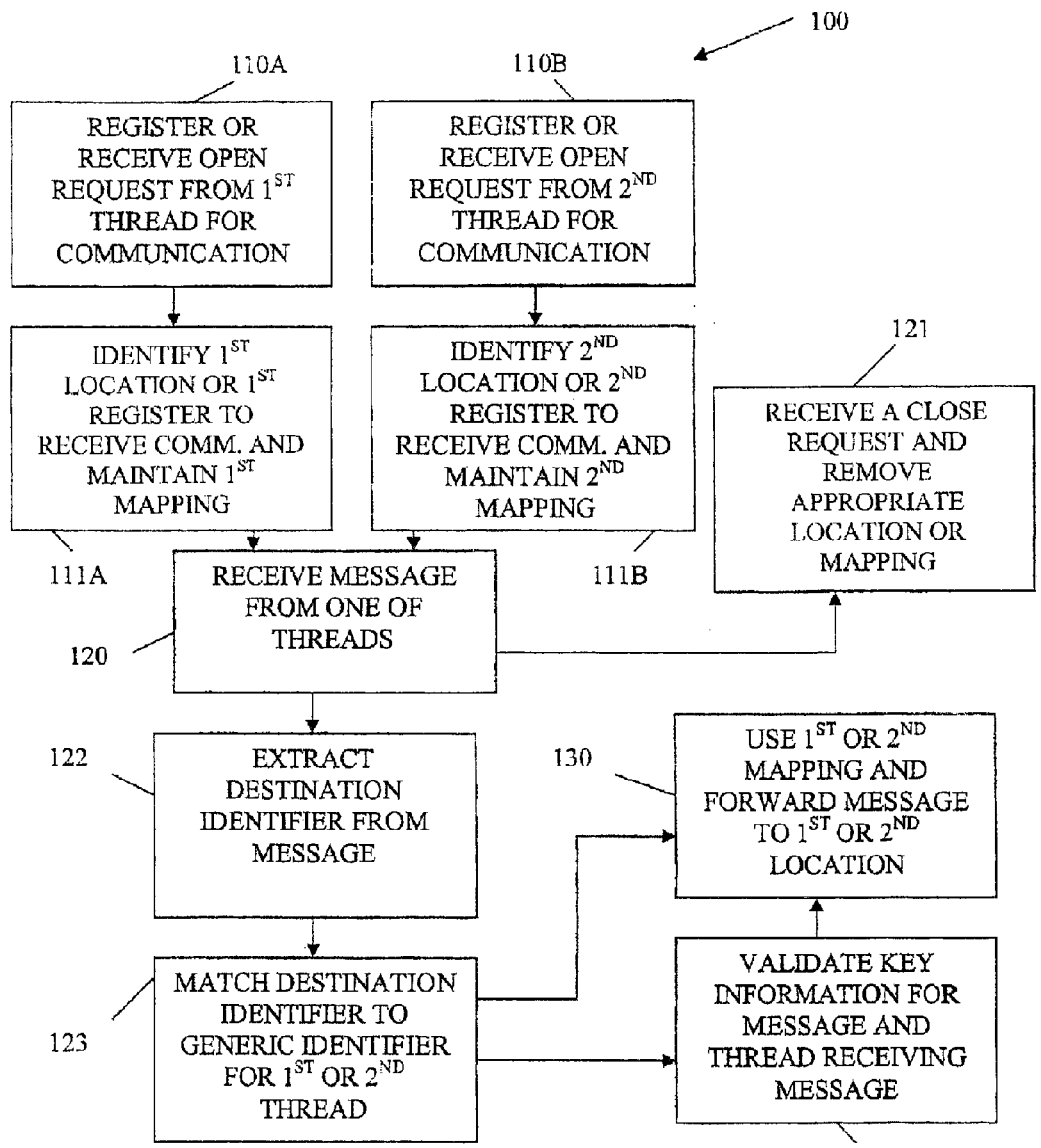
FIG. 1 is a flowchart of a method for thread to thread communication, according to an example embodiment of the invention.

FIG. 1 illustrates a flowchart of one method 100 for thread to thread communication. The method 100 is implemented in a machine accessible medium. However, the method 100 may be implemented in many manners, such as, and by way of example only, the method 100 may be implemented as a series of signals, as a part of a hardware implementation, etc. In an embodiment, the method 100 is a gateway service that acts as an intermediary or conduit between communicating threads. The processing of the gateway service may be implemented as software, firmware, hardware, or various combinations of the same. The method is accessible over any network that is integrated within a multi-processor machine architecture.

Initially, a driver application that manages threaded applications is acquired or developed. The driver application may be viewed as a parent thread that manages the children thread that it spawns. The driver application is initiated in a multi-processor architecture for processing and is designed to communicate with the processing of the method 100 (hereinafter "gateway") in the following manners.

In an embodiment, the parent thread is viewed as a first thread. However, the designation of a parent thread is relative, since an initial child thread of the initial parent thread (e.g., driver application) may itself be a parent thread relative to any sub-children threads that the initial child thread spawns. Furthermore, the terms first and second threads as used herein may refer to ally two threads which may trace their roots back to an initial parent thread. Moreover, an initial parent thread may be viewed as a first or second thread. The designation of the terms parent, child, first, and second threads is resolved based on particular processing states and interactions of the threads.

At 110A, a first thread is registered to the gateway for receiving messages or communications from other threads. Concurrent to, prior to, or subsequent to 110A, a second thread 110B is registered to the gateway for receiving messages or communications from other threads. In an embodiment, registration to the gateway is achieved when a thread issues an open gateway request to the gateway. The open gateway request identifies the requesting thread, the operation (e.g., open gateway request), optional key information, and a reference to a location that the requesting thread desires messages to be received from the other threads during communications.

The gateway acquires a specific location identifier for the requesting thread via the requesting thread's identifier, which is provided during registration. An operation field provided during registration informs the gateway on what action the requesting thread is requesting (e.g., open gateway, registration, forward message, close gateway, etc.). The optional key information provided during registration permits the gateway to perform security on behalf of the requesting thread by instructing the gateway to check any messages directed to the requesting thread for the key information. In another embodiment, the optional key information is generated by the gateway and sent to the requesting thread during registration. The gateway may use a random number generator (RNG), a pseudo-random number generator (PRNG), a secure key exchange protocol such as the public key cryptographic algorithm (e.g., Internet encryption and authentication that uses an algorithm developed by Rivest, Shamir, and Adleman referred to as RSA), or any other technique known to one of ordinary skill in the security arts to generate a key. The reference to a location provided during registration instructs the gateway to a register or memory location that the requesting thread expects to receive messages.

At 111A and 111B, the first and second references to the locations received during registrations for the first and second threads, respectively, are identified from the initial registration process and retained by the gateway for future communication to the first and second threads. In an embodiment, the references identify registers or offsets within registers where the first and second threads expect to see messages. In some embodiments, the gateway maintains first and second mappings between the identities of the first and second threads and their respective references to locations. The gateway maintains the mappings as long as the threads are permitting communications. In other words, the gateway maintains the mappings until a requesting thread closes communication with the gateway (e.g., close gateway operation). The gateway may also have an automatic gate closing capability. The gateway may automatically close the communication for a thread when the thread terminates. This may be achieved by hardware, software, or a combination of hardware and software. For example, the (gateway may monitor the state of active threads or the operating system may inform the gateway when a thread terminates.

Once the first and second threads are registered with the gateway, communication between the threads occurs in the following manners. At some point after registration, at 120, a message is sent from one of the threads to the gateway. The sending thread may be the first and second threads, in instances where two-way communication is occurring. In other instances, where only one-way communication occurs, the sending thread may be a different thread other than the first and second threads. The gateway inspects the operation field of that message to determine what type of operation is being requested of the gateway. Operation types may include an open gateway request (e.g., registration request), a forward message request, or a close gateway request. If the operation associated with the message, at 120, is an open gateway request for a thread that already has previously submitted an open gateway request, then the operation is ignored, or, optionally, this event may trigger an error signal. If the operation is a close gateway request, then, at 121, the gateway removes its maintained reference to the requesting thread's location for receiving messages and any corresponding mapping being maintained by the gateway. This means that the requesting thread may not receive messages via the gateway until a subsequent open gateway or registration request is made again.

If the operation associated with the message, at 120, is a forward message request, then, at 122, the gateway, extracts a destination identifier from the received message. A destination identifier is an identifier provided by the requesting thread which identifies a particular destination thread that is to receive the message. The requesting thread that sends the message, which is received by the gateway at 120, may acquire the destination identifier in a variety of manners. For example, a common parent thread of first and second threads may configure and provide thread identifiers within the first and second threads before the common parent thread initiates the first and second threads for processing. In an alternative embodiment, the gateway may assign generic identifiers that map to specific thread identifiers during registration (e.g., open gateway operation). These generic identifiers may be acquired by the threads from the gateway via their identified locations for receiving messages.

As one example, consider an initial parent thread that registers with the gateway for communication with other threads. The gateway may return a generic identifier for the initial parent thread via a location that the initial parent thread provides to the gateway via registration. Alternatively, the initial parent thread assumes that the registration was successful and that its identifier is the one provided to the gateway during registration (since the initial parent thread will know its own actual identifier or processing location and reference identifier).

Next, the initial parent thread configures a plurality of child threads with its generic or actual identifier and spawns or initiates the children. The identifiers of the children may be assigned after the parent spawns them, and thus may be unknown to the parent, since the children threads may land or be processed on a variety of different processors at a variety of different locations once the hardware, software, or combination of hardware and software loads and executes them. One of the first actions of the children may be to send the initial parent thread their identifiers once they are up and running on particular processors. To do this, each child sends a message to the gateway having the initial parent thread's identifier as the destination thread identifier and having the child's identifier included in the message payload. Alternatively, if the child has a direct mapping and communication channel to the parent, then the child may directly place its identifier in the initial parent thread's desired register location. If the message is sent to the gateway, then the destination identifier permits the gateway to acquire the proper reference location to place the payload of the message. That payload is the identifier for the child who sent the message and is detected by the initial parent thread once written to the register location of the initial parent thread.

At this point the children and the initial parent thread have each other's identifiers and may use those identifiers as destination thread identifiers for messages being, sent between the threads. An indirect route via the initial parent thread may be used so that one child thread may acquire the identifier of another child thread. In other words, the children and parent know each other's identifier, so one child may contact the initial parent thread and request the identifier of another child thread.

At 123, if the gateway is processing a forward message operation, then the destination identifier is extracted from the received message. In some embodiments, this may mean mapping the destination identifier from a generic identifier to a specific thread identifier, which is used at 130 to acquire a proper mapping to a reference to a destination location for the message's payload. Once the reference to a destination location is known, the gateway sends the message payload to that location. The receiving thread detects that data has been written to its location and reads the data, which is the message payload sent from a different thread. That payload then results in some action being taken by the receiving thread based on the content of the received payload.

In some embodiments, before messages are forwarded by the gateway to the appropriate locations, the gateway, at 140, extracts key information from the messages. The key information is matched against key information being maintained for the destination thread. The gateway may use a simple numeric compare, a public key cryptographic algorithm, or any other technique known to one of ordinary skill in the security arts to verify and match a key. If a match occurs, the forward message operation continues as identified above. However, if the key information does not match, then the gateway may ignore the forward message operation, log the failed operation, notify the destination thread of the failed operation, and/or notify another application or service of the failed operation.

The gateway of FIG. 1 acts as a conduit and intermediary for threads to transparently communicate messages to one another. The threads use the gateway to communicate with one another. If some threads are moved to different locations during processing, the gateway may manage these changes and the threads do not have to be modified to continue interacting with one another.

Figure 2:
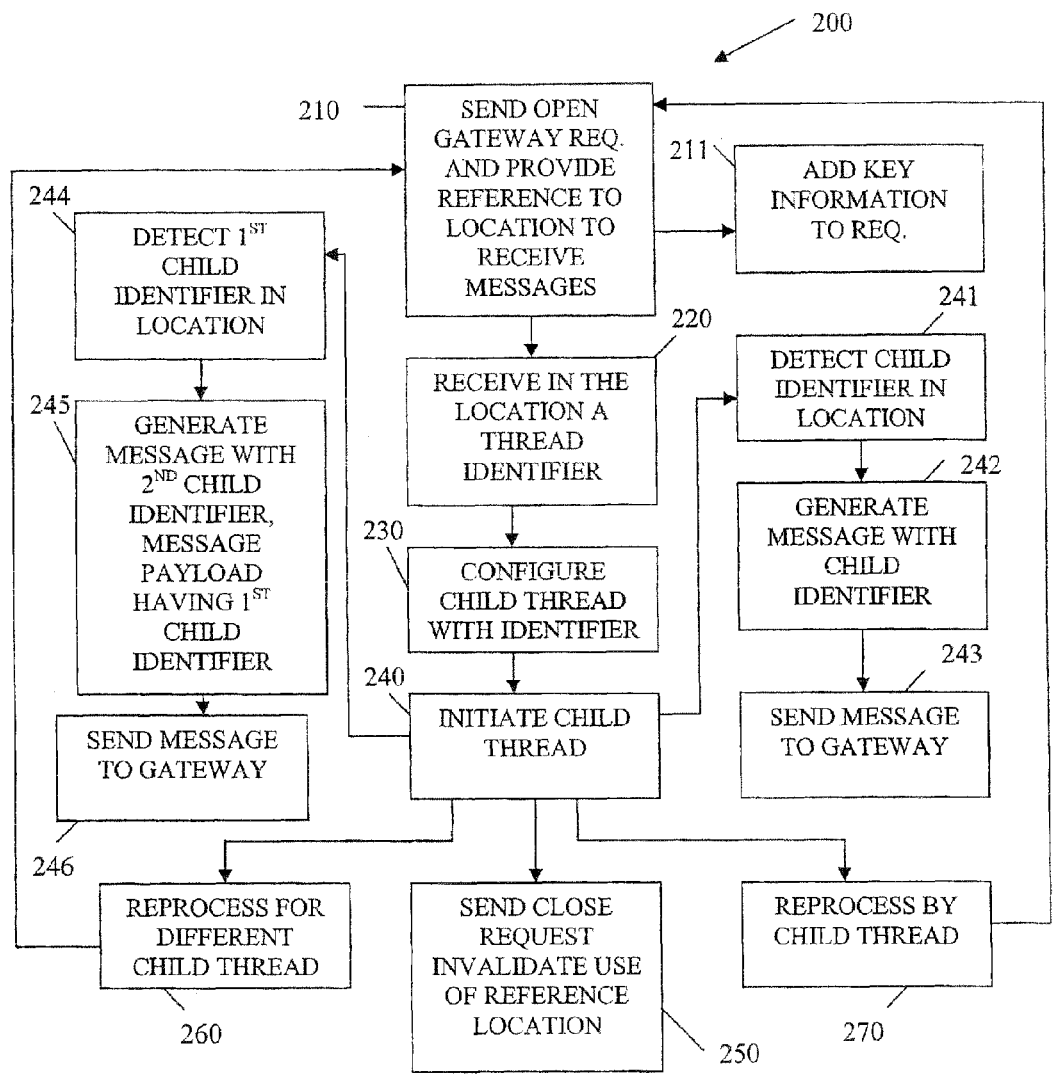
FIG. 2 is a flowchart of another method for thread to thread communication, according to an example embodiment of the invention.

FIG. 2 illustrates another method 200 for thread to thread communication. The method 200 may be implemented in a machine accessible or readable medium, as a series of signals, as a hardware component, etc. In an embodiment, the method 200 represents the processing of a parent thread as it interacts with its children threads and a gateway, such as the gateway described above with method 100 of FIG. 1.

The method 200 (hereinafter "parent thread") is initially loaded and initiated for processing on a particular processor within a multi-processor environment. A processor, such as a simultaneous multi-threaded (SMT) processor, within a multi-processor environment may support multiple threads being executed in parallel. In this case, the thread identifier may include not only the thread's processor information but also the information about the thread slot of the processor. The thread identifier uniquely identifies a particular thread within a multi-processor environment. Once loaded and executing, the parent thread may acquire its identifier. The identifier is an address (memory or register for the parent thread's processor) for directly contacting the parent thread. The parent thread's identifier may be self acquired or acquired from a gateway service.

At 210, the parent thread sends an open gateway request (e.g., registration request) to a gateway. The open gateway request includes a reference to a location (memory or register) that the parent thread desires to receive messages from other threads or from the gateway. In an embodiment, at 211, the parent thread may also add key information to the open gateway request. The key information is managed by the gateway, such that any thread sending a message to the parent thread should have matching key information before the gateway will process the message to the parent thread's desired location. In some embodiments, the gateway generates the initial key information and distributes the same to the threads for use during communications.

In an embodiment, at 220, the parent thread receives back from the gateway a thread identifier. This may be a gateway generically provided identifier for the parent thread or it may be used as a confirmation from the parent thread that the gateway has recognized the open gateway request in situations where the parent thread is using and already has its own thread identifier.

At 230, the parent thread configures a child thread with its own unique thread identifier, the register offset for the child thread to communicate with the parent thread, and then initiates the child thread at 240. By Initiation it is meant that the parent thread requests a software resource (e.g., an operating system (OS)), a hardware resource, or a combination of hardware and software resources to distribute, load, and execute the child thread on a processor within the multi-processor environment determined by a software resource, a hardware resource, or a combination of software and hardware resources. The parent thread will not know when that child thread starts executing and where that child will land within the multi-processor environment and thus will not yet know how to communicate with that child after it begins executing.

To establish communication, the executing child thread uses the gateway to send a message to the parent thread or directly places a message in the parent thread's desired location. Regardless of which technique is used by the child, the parent thread detects a child identifier in its desired location, at 241, at some point after the child begins execution. Armed with the child identifier and other information such as a register offset, the parent thread, at 242, may generate a message to the child thread to alter the operation or actions of that executing child thread. At 243, this message is sent to the gateway as a forward message operation and it includes the newly acquired child identifier. This assumes that the child thread has also previously issued an open gateway request to the gateway indicating that the child thread is available for communication and indicating a desired location for which the child thread wants to receive messages.

In addition to establishing communication between a parent thread and a single child, the parent thread may facilitate communications between two or more of its children. For example, at 244, the parent thread may detect a message payload in its desired location which is a first child's identifier. In response to this, the parent may determine that a second child may desire to communicate with the first child. The parent already has the second child's identifier. Thus, at 245, the parent generates a message having the second child's identifier listed as the destination identifier and the payload of that message includes the first child's identifier. At 246, the message is sent to the gateway for processing to a desired location for receiving messages associated with the second child. The second child detects at its desired location the message, inspects the payload, and acquires the first child's identifier. The second child may now use the gateway to communicate with the first child. The technique presented at 244-246 may also be used by the parent to provide the first child with the second child's identifier and thereby permit the first child to use the gateway to communicate with the second child.

At 250, the parent may detect a processing state that necessitates terminating communication with other threads. Thus, the parent thread sends to the gateway a close gateway request. This informs the gateway to invalidate use of the parent's desired location, which results in any messages directed to the parent being ignored until the parent reissues a new open gateway request.

In an embodiment, at 260, the processing performed by the parent thread may recur for different child threads for a plurality of iterations. Additionally, at 270, the parent thread's processing may be recursively implemented by the child thread. In such a case, the child thread becomes the parent thread for its sub-children. That is, a child thread may use the same processing to establishing communication with its children threads. Additionally, a child's child threads may communication with the original child's parent. In fact, the communication can be iterated and recursive and can occur across multiple levels between a parent, an original child, and the original child's children.

Figure 3:
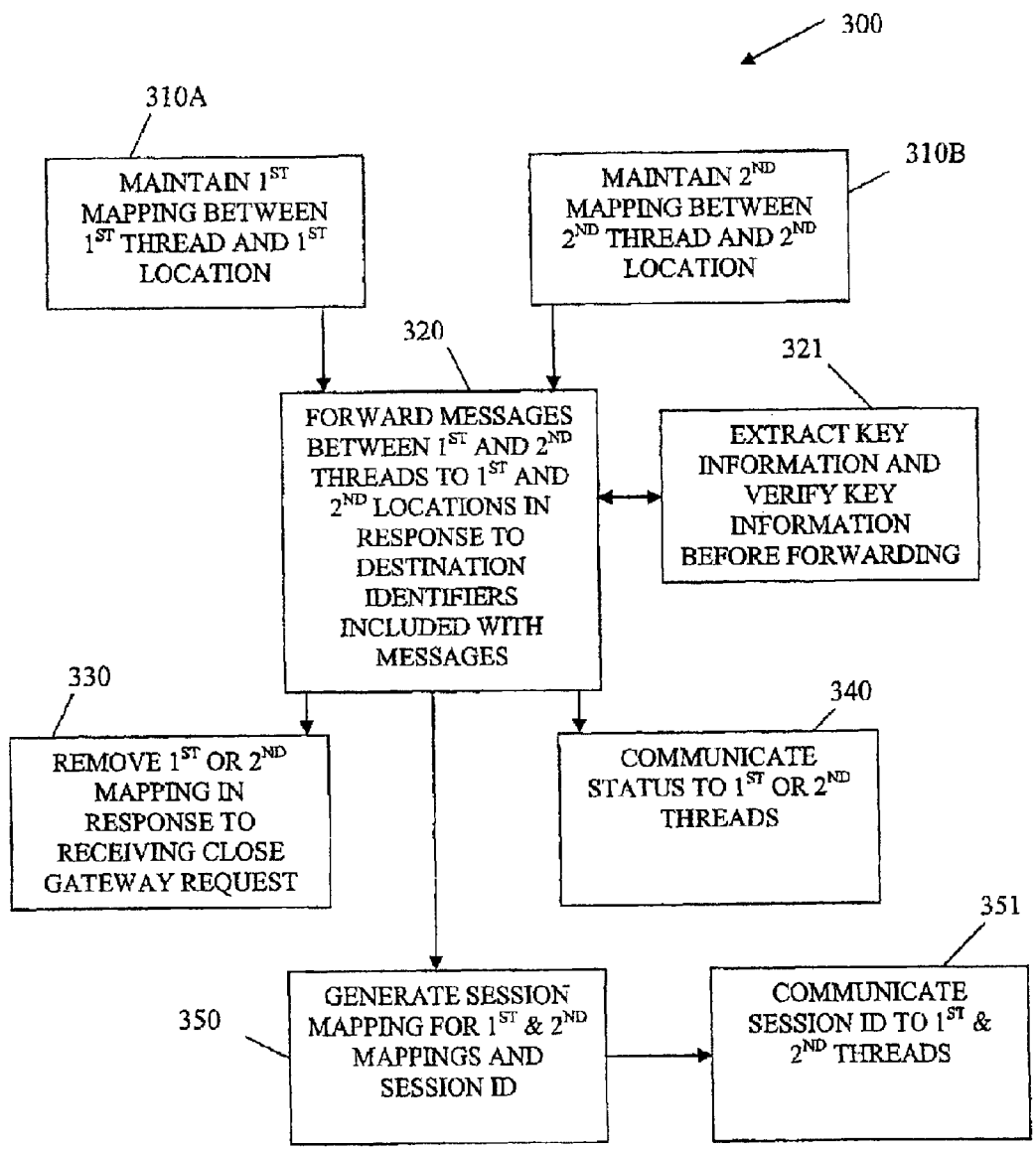
FIG. 3 is a flowchart of still another method for thread to thread communication, according to an example embodiment of the invention.

FIG. 3 illustrates a flowchart of still another method 300 for thread to thread communication. The method 300 may be implemented in a machine accessible or readable medium, as a series of signals, as a hardware component, etc. In an embodiment, the method 300 is implemented in a machine that executes the method 300. The method 300 may be loaded into the machine via removable media, memory, storage, registers, or via an external networked machine having the instructions of the method 300. In an embodiment, the method 300 represents the processing logic of a gateway. The gateway acts as an intermediary or conduit for thread to thread communications occurring in a multi-processor environment.

The method (hereinafter "gateway") initially, at 310A and 310B, maintains a first mapping between a first thread and its desired location for receiving messages and a second mapping between a second thread and its desired location for receiving messages. The processing order for maintaining the mappings may occur in any sequence. That is, the first and second mappings may be substantially acquired and maintained concurrent to one another, the first mapping may be acquired and maintained before the second mapping, or the second mapping may be acquired and maintained before the first mapping.

The mappings are initially established via techniques described above with respect to the open gateway operation discussed with methods 100 and 200 of FIGS. 1 and 2, respectively. Once the mappings are established and being maintained, at some later point in time the gateway receives forward message operations from the threads. These messages include destination thread identifiers, which are extracted by the gateway from the messages and used to acquire the proper mapping to a desired location for the destination thread.

In an embodiment, at 321, the messages may also include key information associated with the destination thread. The gateway extracts this key information and verifies it against key information being maintained for the destination thread. If the key information is verified as a match, then a message is processed from a sending thread to the destination thread. If no match occurs, then the gateway ignores the message, notifies the destination thread, logs the failed message, and/or notifies a different service or application.

In some instances, at 330, the message received from a sending thread may be a close gateway request. This indicates to the gateway that the sending thread does not desire to receive any further messages via its identified location. As a result, the gateway removes its mapping for the sending thread and ignores any subsequent received messages directed to the sending thread. In some other instances, the gateway may have an automatic gate closing capability that does not have to have a specific close gateway message in order to be processed. This may occur when the gateway monitors states of active threads or when a software resource, a hardware resource, or a combination of hardware and software resources informs the gateway when a particular thread terminates.

In an embodiment, at 340, the gateway may also detect that a received message is a request for status from one of the threads. In response to the status request, the gateway provides a status to the requesting thread via its desired location. In another embodiment, the received message may be a request to temporarily suspend messages to a requesting threads desired location. In these embodiments, the gateway may queue messages or ignore messages during any suspension period. Once the requesting thread lifts the suspension any queued messages may be serially streamed to the requesting thread's desired location for processing or attention by the requesting thread.

In some embodiments, at 350, the gateway may maintain both the first and second mappings as a single multiple mapping between multiple threads. In these embodiments, the gateway maintains mappings as session mappings and provides, at 351, session identifier to threads which are participating in a communication session identified by the session identifier. This may be useful when multiple threads desire to communicate in mass or in synchronization with one another.

Figure 4:
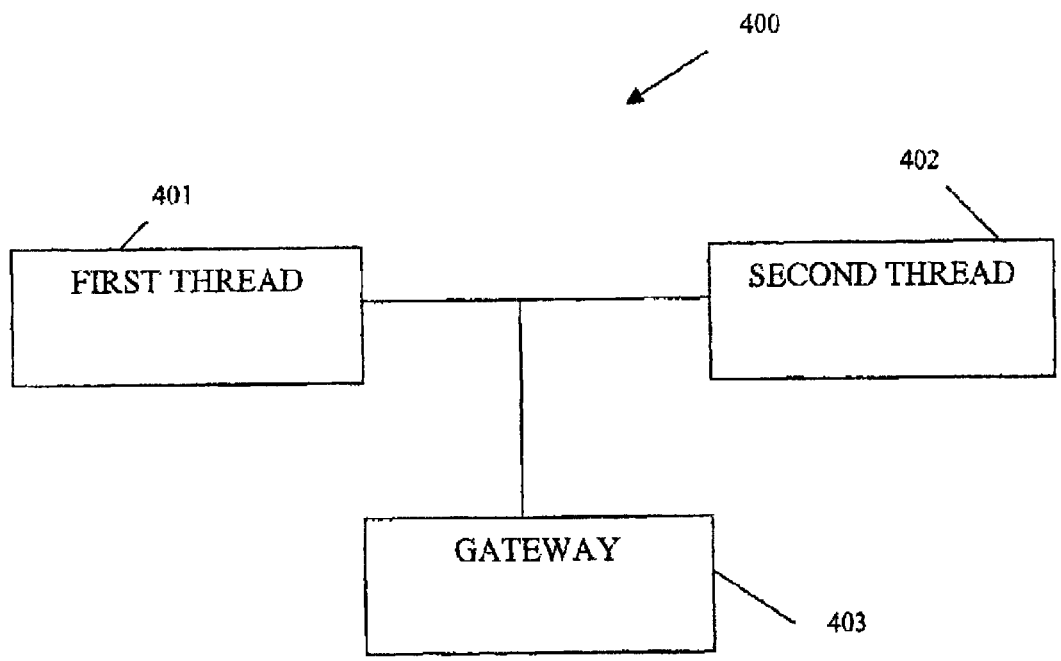
FIG. 4 is a diagram of a thread to thread communication system, according to an example embodiment of the invention.

FIG. 4 is a diagram of a thread to tread communication system 400. The thread to thread communication system 400 is implemented in a machine accessible or readable medium. The thread to thread communication system 400 may be implemented in software, hardware, firmware, or combinations of the same. Moreover, the thread to thread communication system 400 is accessible from and processes in a multi-processor environment that supports parallel processing. In an embodiment, the thread to thread communication system 400 includes threads 401 and 402 that process in the manner described above with respect to the method 200 of FIG. 2 and a gateway 403 that processes in manners described above with methods 100 and 300 of FIGS. 1 and 3, respectively.

The thread to thread communication system 400 minimally includes a first thread 401, a second thread 402, and a gateway 403. The designation of first thread 401 versus second thread 402 is relative and dependent upon the processing state and interactions occurring during operation of the thread to thread communication system 400. That is, in some instances a first thread 401 may become a second thread 402 and vice versa.

The gateway 403 is an intermediary or conduit for communications occurring between the threads 401 and 402. The individual threads 401 and 402 may not know where the other thread 401 or 402 is located or how to contact it at any particular point during processing; but, the gateway 403 knows how to contact the threads 401 and 402 and how to facilitate desired messages to the threads 401 and 402.

The gateway 403 resolves message relaying by maintaining desired locations for each of the threads 401 and 402 where each of the threads 401 and 402 expect to receive or see messages. The threads 401 and 402 are configured to detect when data is written to their desired locations for receiving messages. This configuration may be achieved by another application sending a notice or event to the threads 401 and 402 when a write operation to the desired locations completes. Alternatively, the configuration may be achieved within the logic of the threads 401 and 402, such that the threads 401 and 402 have a portion of logic that periodically and systematically checks their desired locations for data associated with received messages. In still another alternative, a portion of the logic for one of the threads 401 or 402 may wake up that thread 401 or 402 from an inactive or sleep mode or state upon receiving a message targeting that thread 401 or 402.

The gateway 403 supports a variety of operations that it may perform on behalf of requesting threads 401 and 402. For example, the gateway 403 processes operations associated with registering one or more of the threads 401 and 402 for receiving communication via an open gateway request. The gateway 403 processes operations to forward messages from a sending thread 401 or 402 to a desired location of a destination thread 401 or 402. Moreover, the gateway 403 processes operations to terminate communications to one or more of the threads 401 and 402 by removing mappings to desired locations of those threads 401 and 402 via a close gateway request. In some other instances, the gateway 403 may automatically terminate communications to one or more of the threads 401 and 402 without a specific close gateway message. This may occur when the gateway 403 monitors states of active threads or when a software resource, a hardware resource, or a combination of software and hardware resources informs the gateway 403 when a particular thread 401 or 402 terminates.

In an embodiment, the gateway 403 may also support sending status information to a requesting thread 401 and 402. Additionally, in some instances, the gateway 403 transparently supports security techniques by extracting and validating key information against maintained key information, where the messages include key information. This permits the gateway 403 to provide some level of security to the threads 401 and 402 by ensuring key information is properly identified for a thread 401 or 402 receiving a message. In an yet another embodiment, the gateway 403 may itself generate and distribute key information to the threads 401 and 402 for use during communications with one another.

In an embodiment, the first thread 401 is a parent thread to a plurality of child threads where the second thread 402 is one of those child threads. In another embodiment, the first and second threads 401 and 402 are both child threads to a common parent thread. In still another embodiment, the first and second threads 401 and 402 are child threads on different hierarchical levels. For example, the first thread 401 may be a first child of an initial parent thread whereas the second thread 402 may be a sub child of a different first child for the initial parent thread.

Figure 5:
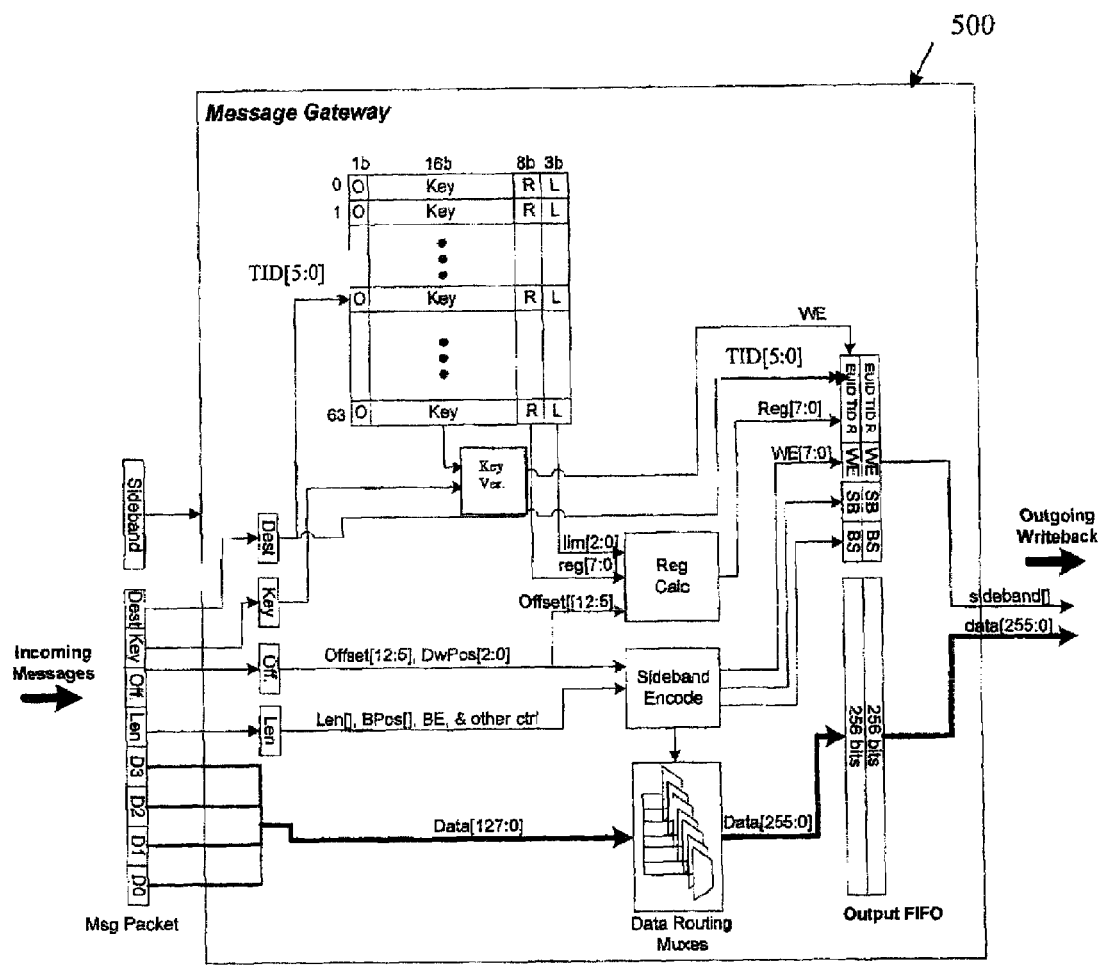
FIG. 5 is a diagram of an example gateway architecture that facilitates thread to thread communication, according to an example embodiment of the invention.

FIG. 5 is a diagram of architecture example 500 for a gateway that facilitates communications between threads. FIG. 5 is presented for purposes of illustration only and is not intended to limit embodiments of the invention. Accordingly, the various hardware, firmware, and connections associated therewith of FIG. 5 may be altered without departing from the teachings presented herein. The architecture 500 is implemented or integrated within a multi-processor architecture that supports parallel processing.

The gateway architecture 500 receives incoming messages from threads processing in a multi-processor architecture and may in response to any given incoming message write messages or data out of the gateway architecture 500 to memory or register locations of the multi-processor architecture.

The gateway architecture 500 supports at least one of three operations: an open gateway request, a close gateway request, and a forward message request. Each of these requests may be sent to the gateway in a predefined data format recognized and stripped out by the gateway for the proper processing. Alternative, some of these requests may be independently generated by the gateway architecture 500, such as the close gateway request. In still other alternatives, the gateway architecture may facilitate initial communication, where that communication there after is direct between two threads.

For example, an open gateway request is sent from a thread to the gateway and may include information associated with identifying the request as an open gateway request, key data for any message validation, a register base for receiving return messages from the gateway. Upon receipt of an open gateway request, the gateway puts the key data and register base in its memory indexed within memory by a pointer to the requesting thread's identifier, sets communication for the requesting thread to open, extracts the thread's identifier, and optionally returns the thread's identifier back to the requesting thread's register base.

A close gateway request which is sent from a requesting thread to the gateway may include information associated with identifying the request as a close gateway request. Here, only the information that identifies the request as a close gateway request is sent. However, in some embodiments, the requesting thread may send a return register for receiving validation that the close request was processed. In an embodiment, confirmation may still occur when the gateway returns a NULL pointer back to the requesting thread in response to receiving a close gateway request. In response to a close gateway request, the gateway resets or clears the previous open gateway bit. If no previous open gateway bit was set then no action is taken.

A forward message request sent from a requesting thread to the gateway may include both a message descriptor and payload in a single data phase. This includes information identifying the request as a forward message request, a destination thread's identifier, any optional key information associated with the destination thread, a register key offset for the message payload, the payload size, and the payload itself. In response to a valid message, the gateway forwards the payload to the destination's desired register location and may optionally send a notification bit to the destination thread. The notification bit may be monitored by the destination thread or by another application on behalf of the destination thread. This is an alternative mechanism for the destination thread being identified when a message payload is received. An invalid message may be logged or generate a notification to the destination or another application or service.

Side band signals may be used by thread to thread communications to indicate the size of a message being sent. In other words the side band signals may indicate whether a particular message is 1 data word, 2 data words, 3 data words, 4 data words, etc. The side band signals may also be used to indicate whether threads are to receive notifications or not, to indicate whether a message terminates (this may be used by a thread to identify message boundaries for multiple messages), or the like.

The gateway architecture 500 of FIG. 5 depicts an example architecture that may be implemented in a multi-processor environment for purposes of establishing a gateway. That gateway acts as a conduit and intermediary for thread to thread communication.

The above description is illustrative, and not restrictive. Many other embodiments will be apparent to those of skill in the art upon reviewing the above description. The scope of embodiments of the invention should therefore be determined with reference to the appended claims, along with the full scope of equivalents to which such claims are entitled.

The Abstract is provided to comply with 37 C.F.R. §1.72(b) in order to allow the reader to quickly ascertain the nature and gist of the technical disclosure. It is submitted with the understanding that it will not be used to interpret or limit the scope or meaning of the claims.

In the foregoing description of the embodiments, various features are grouped together in a single embodiment for the purpose of streamlining the disclosure. This method of disclosure is not to be interpreted as reflecting an intention that the claimed embodiments of the invention have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate exemplary embodiment.

What is claimed is:

1. A method, comprising:
   registering at least one of a first and second threads to a gateway for communications by sending an open gateway request;
   identifying a first location for the first thread to receive communications from the second thread if the first thread is registered;
   identifying a second location for the second thread to receive communications from the first thread if the second thread is registered;
   receiving a message having a destination identifier identifying a destination thread and a payload identifying a thread not known to the destination thread from one of the first and second threads; and
   forwarding the message to a location corresponding to the destination thread using the destination identifier included within the message to communicate the payload to the destination thread;
   establishing communication by the destination thread with the thread not known to the destination thread using the payload.

2. The method of claim 1, further comprising:
   receiving a close communication request from a requesting thread, which is identified as the first or the second thread; and
   removing a location of the requesting thread from use during the communications.

3. The method of claim 1, further comprising:
   detecting an event indicating one of the threads is to have its communications closed; and
   removing a location of the detected thread from use during communications.

4. The method of claim 1, further comprising validating key information included with the message before forwarding the message.

5. The method of claim 1, wherein identifying further includes at least one of:
   receiving a first register location as the first location in the open gateway request from the first thread; and
   receiving a second register location as the second location in the open gateway request from the second thread.

6. The method of claim 5, wherein identifying further includes at least one of:
   maintaining a first mapping between a first generic identifier to the first register location for the first thread; and
   maintaining a second mapping between a second generic identifier to the second register location for the second thread.

7. The method of claim 6, wherein forwarding further includes extracting from fields of the message the destination identifier which is identified as the first or second generic identifier in order to determine which of the mappings provides an appropriate register location for the message.

8. A system, comprising:
   a first register to store messages for a first thread;
   a second register to store messages for a second thread; and
   a device separate from said first and second registers to register at least one of the first and second threads and returning one of a first identifier and second identifier to one of the first and second registered threads;
   the device further to receive a message from one of the first and second threads, the message having a destination identifier identifying a destination thread and a payload identifying a thread not known to the destination thread, identifying a corresponding register for storing the message based on the identified destination thread, and forwarding the message to the corresponding register to communicate the payload to the destination thread.

9. The system of claim 8, wherein the device further issues status information to the first or second threads upon request.

10. The system of claim 8, wherein the first thread is a parent thread associated with a plurality of child threads and the second thread is one of the plurality of child threads.

11. The system of claim 8, wherein the first and second threads are children of a common parent thread.

12. The system of claim 8, wherein the first and second threads are child threads on different hierarchical levels.

13. The system of claim 8, wherein the device extracts key information from the message, and wherein the key information validates the identities of the first and second threads to one another during communications.

* * * * *